(12) United States Patent
Tin (10) Patent No.: US 10,761,176 B1
(45) Date of Patent: Sep. 1, 2020

(54) SYSTEMS AND METHODS FOR DISTANCE INDEPENDENT DIFFERENTIAL SIGNATURE DETECTION

(71) Applicant: Honeywell International Inc., Morris Plains, NJ (US)

(72) Inventor: Steven Tin, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/162,276

(22) Filed: Oct. 16, 2018

(51) Int. Cl.
*G01S 1/72* (2006.01)

(52) U.S. Cl.
CPC .................................. *G01S 1/72* (2013.01)

(58) Field of Classification Search
None
See application file for complete search history.

(56) References Cited

U.S. PATENT DOCUMENTS

| | | | |
|---|---|---|---|
| 3,895,344 A | 7/1975 | Gill et al. | |
| 4,313,185 A * | 1/1982 | Chovan | G01H 9/006 356/477 |
| 4,594,695 A | 6/1986 | Garconnat et al. | |
| 4,630,246 A | 12/1986 | Fogler | |
| 4,858,462 A * | 8/1989 | Coulter | G01M 3/243 73/40.5 A |
| 4,920,332 A | 4/1990 | Philippe | |
| 5,432,862 A | 7/1995 | Hirsch | |
| 5,798,983 A | 8/1998 | Kuhn et al. | |
| 6,370,083 B1 * | 4/2002 | Foreman | G01V 1/186 367/124 |
| 8,085,185 B2 * | 12/2011 | Stewart | G01S 7/032 342/159 |
| 8,111,174 B2 | 2/2012 | Berger et al. | |
| 8,223,067 B2 * | 7/2012 | Moulton | G01S 7/032 342/159 |

(Continued)

OTHER PUBLICATIONS

European Patent Office, "Extended European Search Report from EP Application No. 19189930.1", from Foreign Counterpart to U.S. Appl. No. 16/162,276, dated Feb. 19, 2020, pp. 1-10, Published: EP.

(Continued)

*Primary Examiner* — Reginald S Tillman, Jr.
(74) *Attorney, Agent, or Firm* — Fogg & Powers LLC (57) ABSTRACT

A differential signature detection system is provided. The system comprises: a target sensor, wherein the target sensor is configured to measure acoustical signals within a first narrow band around a target frequency; an offset sensor, wherein the offset sensor is configured to measure acoustical signals within a second narrow band around an offset frequency; and a controller coupled to the target sensor and the offset sensor, wherein the controller is configured to: compare a signal output of the target sensor with an output of the signal output of the offset sensor to calculate a differential measurement that comprises a difference in signal peak intensity; compare the differential measurement to a reference signal, wherein the reference signal comprises a threshold indicative of a presence of a characteristic signature peak associated with a target object; and produce an output based on the comparison between the differential measurement and the reference signal.

20 Claims, 8 Drawing Sheets

(56) References Cited

U.S. PATENT DOCUMENTS

2009/0115635 A1   5/2009  Berger et al.
2013/0322215 A1  12/2013  Du et al.
2016/0216363 A1   7/2016  Martin et al.
2017/0219686 A1   8/2017  Xie et al.

OTHER PUBLICATIONS

Chellapa et al. "Vehicle detection and tracking using acoustic and video sensors," 1988 International Conference on Acoustics, Speech, and Signal Processing; Published Jun. 2004; pp. III-793 to III-796.
Ding et al. "Vehicle Detection by Sensor Network Nodes," California PATH Research Report; California Partners for Advanced Transit and Highways; Published Oct. 2014; pp. 1-65.

\* cited by examiner

SYSTEMS AND METHODS FOR DISTANCE INDEPENDENT DIFFERENTIAL SIGNATURE DETECTION

U.S. GOVERNMENT LICENSE RIGHTS

This invention was made with Government support under Government Contract # HR0011-15-C-0141 awarded by DARPA. The Government has certain rights in the invention.

BACKGROUND

The use of passive acoustical sensors is becoming increasingly present in the fields of object detection and perimeter monitoring. Such sensors can provide integral data on the specific properties of an object of interest useful for a variety of applications, including but not limited to: military threat detection, highway traffic monitoring, environmental monitoring, and critical infrastructure protection. Conventional sensors gather environmental data by receiving input signals and continuously performing wideband Fast Fourier Transform (FFT) analysis to determine if the wideband spectrum contains a set of frequencies unique to the monitored object. While FFT analysis can be temporally convenient, it is often energy inefficient due to the large excess of continuous calculations performed from analyzing unnecessary background noise. This leads to higher maintenance costs by frequently inspecting or replacing sensors every few months or fewer. Furthermore, most acoustic sensors are tuned to detect objects only for a particularized distance and must be recalibrated each time the sensor is moved, making unattended sensors of limited use.

For the reasons stated above and for other reasons stated below, it will become apparent to those skilled in the art upon reading and understanding the specification, there is a need for distance independent differential signature detection.

SUMMARY

The Embodiments of the present invention provide systems and methods for object monitoring and will be understood by reading and understanding the following specification.

A differential signature detection system is provided. The system comprises: at least one target sensor, wherein the at least one target sensor is configured to measure acoustical signals within a first narrow band around a target frequency; at least one offset sensor, wherein the at least one offset sensor is configured to measure acoustical signals within a second narrow band around an offset frequency; and a controller coupled to the at least one target sensor and the at least one offset sensor, wherein the controller is configured to: compare a signal output of the at least one target sensor with an output of the signal output of the at least one offset sensor to calculate a differential measurement that comprises a difference in signal peak intensity; compare the differential measurement to a reference signal, wherein the reference signal comprises a threshold indicative of a presence of a characteristic signature peak associated with a target object; and produce an output based on the comparison between the differential measurement and the reference signal.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the disclosed embodiments, and it is to be understood that other embodiments may be utilized and that logical, mechanical, and electrical changes may be made without departing from the scope of the present disclosure. The following detailed description, therefore, is not to be taken in a limiting sense.

Embodiments of the present disclosure provide systems and methods for object detection using differential signal detection. As further described below, the embodiments herein facilitate low power consumption and detection of objects independent of the distance of the detector from that object. The embodiments presented herein thus allow the use of minimal power upkeep costs, potentially at the nanoWatt (nW) level, for a sensor in an active detection state while simultaneously allowing continuous environmental monitoring. The maintenance costs are further reduced by calibrating the sensor to reliably detect a target object for all available detection distances, thus mitigating the costs of recalibrating the sensor for each respective distance from the target object. In one embodiment, a target sensor is used in conjunction with a companion offset sensor whose measurements are compared to derive a differential measurement. In another embodiment, the output of the grouped sensors are further weighted to compare against a predetermined reference threshold.

Figure 1:
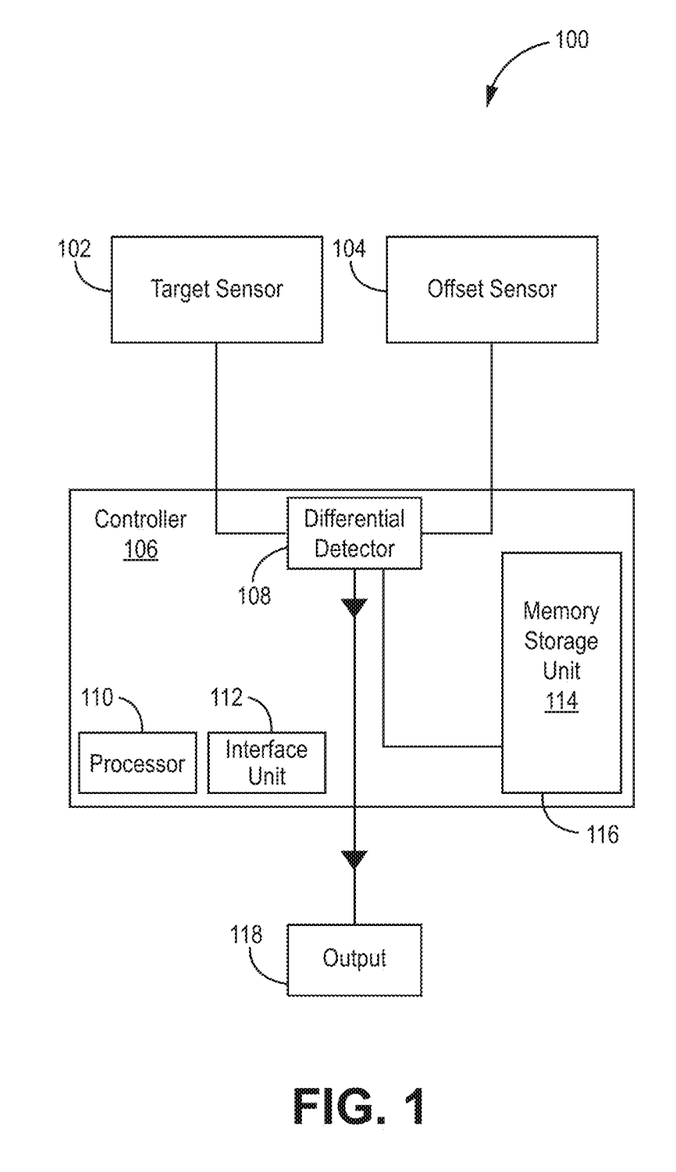
FIG. 1 is a diagram illustrating an object detection system of one embodiment of the present disclosure using differential measurement detection.

FIG. 1 is a block diagram illustrating differential signature object detection system 100 of one embodiment of the present disclosure. In the embodiment shown in FIG. 1, system 100 comprises at least one target sensor 102, at least one offset sensor 104, and a controller 106. The target sensor 102 and offset sensor 104 can comprise any device that measures environmental signals of interest, such as acoustical signals. In some embodiments, the target sensor 102 and offset sensor 104 can also be implemented with piezoelectric materials. In some embodiments, controller 106 comprises a processor 110 coupled to a memory storage unit 114 that executes code in order to perform one or more of the functions of the controller 106 described herein. In some embodiments, the weights for the target frequencies may be stored within memory storage unit 114. In some embodiments, target sensor 102, and offset sensor 104 each comprise narrow band acoustical or vibration energy sensors, such as but not limited to microphones, vibration sensors, and other devices that measure acoustical waves. With embodiments of the present disclosure, measurements from target sensor 102 and offset sensor 104 are compared in order to obtain a differential signature measurements. This configuration for obtaining differential signature measurements eliminates the need for performing FFT calculations, or other processing intensive algorithms, to determine when frequency peaks indicative of an object of interest are being received.

The inputs from the target sensor 102 and offset sensor 104 are sent to the controller 106. The target sensor 102 and offset sensor 104 are designed to monitor only narrow band frequency ranges. The processor 110 may perform additional processing functions as needed to identify the relevant target frequencies, such as signal enhancement or filtration. In some embodiments, the processor 110 can be a separate entity that receives input signals from the target sensor 102 or offset sensor 104; however, in other embodiments the processor 110 can be located within the target sensor 102 or offset sensor 104 itself. Additionally, the controller 106 may contain an interface unit 112. The interface unit 112 allows user input for a variety of system functions, including but not limited to: post-wideband spectrum processing, distance calibration adjustments, and reference threshold adjustments.

Figure 2A:
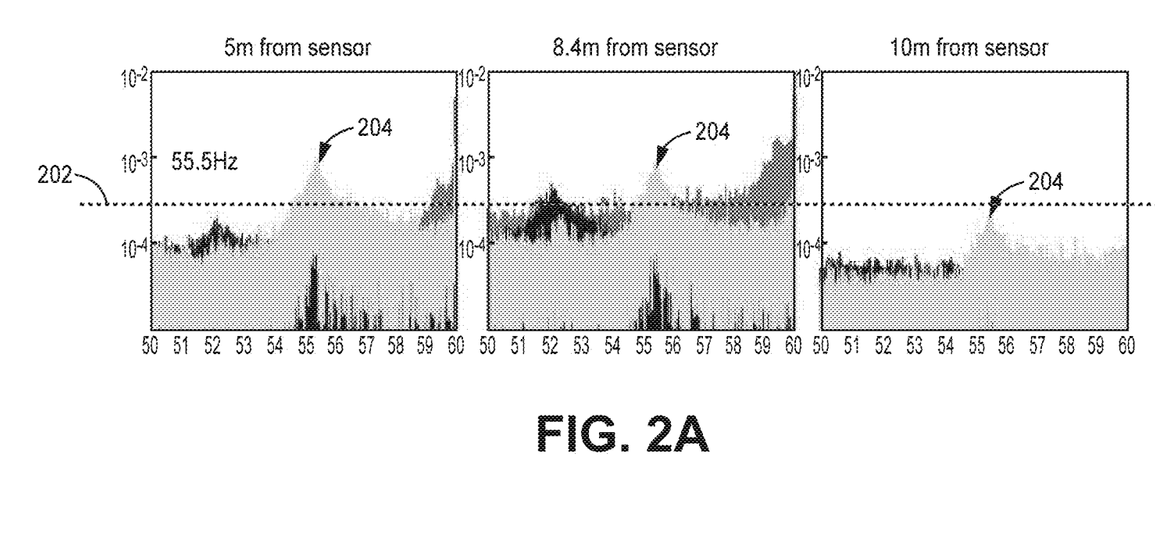
FIGS. 2A and 2B are diagrams illustrating operation of an object detection system of one embodiment of the present disclosure.
Figure 2B:
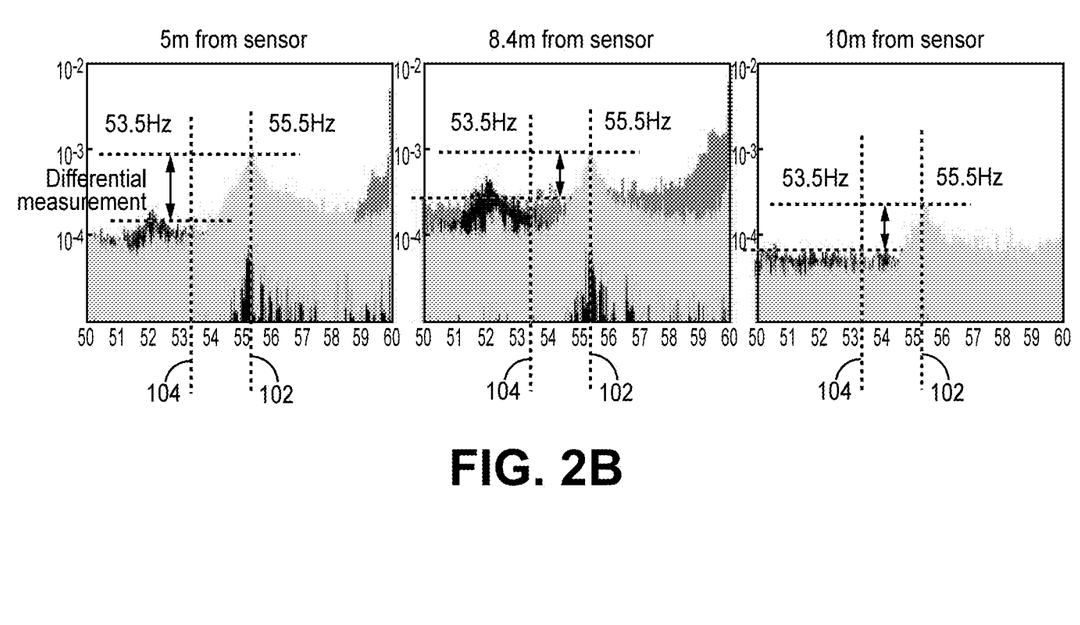

FIGS. 2A and 2B illustrate operation of a differential signature detection system, such as the system 100 shown in FIG. 1. As shown in FIG. 2A, the target sensor 102 may be calibrated to detect objects that emit acoustical energy characterized by a target frequency signature comprising spikes or peaks at certain frequencies. For example, FIG. 2A illustrates acoustical energy measured by target sensor 102 over a narrow band spectrum. Narrow band spectral monitoring as described herein is defined as frequencies within <1% of the selected target frequency. The presence of acoustical energy received at frequency $f_{target}$ (shown at 204) in excess of a threshold value 202 indicates that acoustic energy having a frequency within a spectrum associated with an object of interest has been received. In the particular implementation shown in FIG. 2A, an example target frequency signature $f_{target}$ of 55.5 Hz is used for illustrative purposes only. In other embodiments, other target frequencies may be used, the selection of which would be based on the target object that needs to be detected. However, merely establishing a threshold setting 202 based on an absolute measurement of acoustical energy received by target sensor 102 to discern whether an object of interest is present may result in either false positive detection or missed detections. FIG. 2A shows that as the target is further away from the sensors where the signature signal strength at 55.5 Hz decreases. When the target is 10 meters away from the sensor, although there exists a large signal-to-noise ratio correlating a strong likelihood of the presence of the target object at the observed characteristic signature peak of the desired target 204, but the observed characteristic signature peak levels below the threshold 202, a missed detection occurs. A false positive may be triggered in a noisy environment that produces another signal (usually wide-band) falling within the frequency band monitored by target sensor 102 with sufficient energy to meet the threshold 202. As an example for false positives, as shown in FIG. 2A, another signal with sufficient energy to meet threshold 202, could produce a false positive.

As opposed to relying on detection of absolute threshold levels, system 100 implements a differential detector that measures the differences between signals received from the target sensor 102 and the offset sensor 104, which may be used to detect the existence of a received characteristic signature peak 204, regardless of the distance between the sensor and the target object and the presence of interfering ambient noise.

Because target sensor 102 is tuned to a narrow spectral band, it receives the signal data at a width that captures the peak 204 and other signals within that band. Offset sensor 104, is also tuned to a narrow spectral band, but that band is slightly offset from the band of the target sensor so that it does not also measure the target frequency at peak 204. In the particular implementation shown in FIG. 2B, an example offset frequency signature $f_{offset}$ of 53.5 Hz is used for illustrative purposes only. In other embodiments, other offset frequencies may be used, the selection of which would be based on the target object that needs to be detected. As an example, FIG. 2B shows an offset sensor tuned to 53.5 Hz to compare to a target sensor tuned to 55.5 Hz. The offset sensor 104 therefore functions to measure the ambient acoustic energy level within the immediate proximity of the target sensor 102, so that a differential measurement between the two sensors can be obtained, as shown in FIG. 2B. If the target sensor 102 produces a first measurement of acoustic energy, and the offset sensor 104 produces a second measurement of acoustic energy that is the same, or approximately the same at the first measurement, then the differential measurement (meaning the difference obtained by subtracting the second measurement from the first measurements) will be small. This would be an indication of that the characteristic signature peak 204 of interest has not be detected. In contrast, if the target sensor 102 produces a first measurement of acoustic energy, and the offset sensor 104 produces a second measurement of acoustic energy that is substantially less than the first measurement, then the differential measurement will not be small. In that case, if the differential measurement obtained exceeds a threshold, then that is an indication that a spike such as the characteristic signature peak 204 has been received. This indication may then be evaluated, as discussed below, to determine if the approach of a target object has been detected.

In the embodiment shown in FIG. 1, a single offset sensor pair is utilized, comprising a target sensor 102 and offset sensor 104. This embodiment may be useful, for example, when a single target frequency can be used to distinguish a target object from other objects. A differential detector 108 is used to compare the amplitude of the signal at the target frequency with the amplitude at the offset frequency to determine the difference in signal peak intensity of the two frequencies as discussed in FIG. 3 below. The output 118 of the controller 106 may be sent to a perimeter monitoring station to trigger additional functions, such as opening a communications channel or to activate security protocols.

Figure 3:
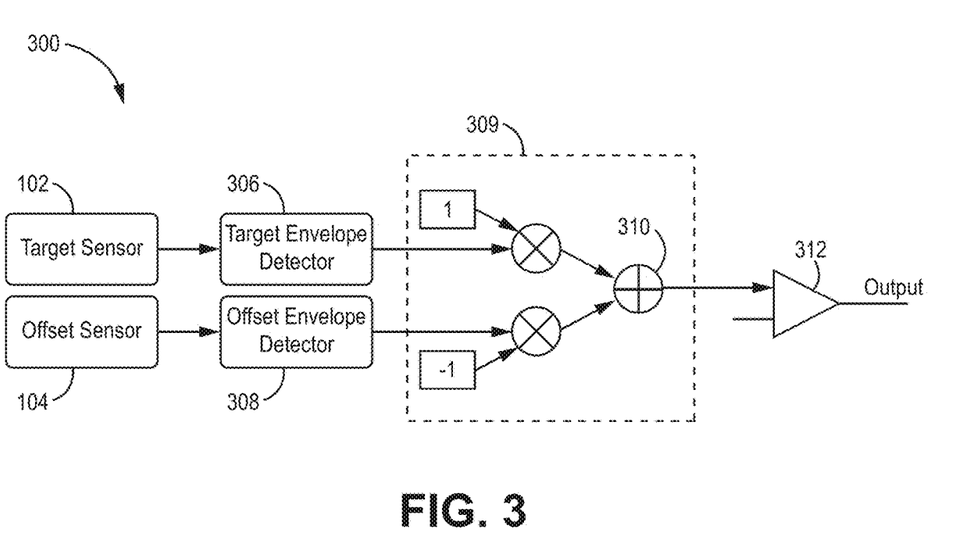
FIG. 3 is a diagram of a single target frequency differential measurement detector for a as presented in one embodiment of the present disclosure.

FIG. 3 is a block diagram illustrating a differential detector 300 used in at least one embodiment in the present disclosure, such as the differential detector 108 of FIG. 1. As described above, the target sensor 102 is used to monitor the narrow band of a target frequency while offset sensor 104 is used to monitor the narrow band range of a frequency just outside the target frequency. The signals from both sensors 102 and 104 are input into the differential detector 300. The signals from the target sensor 102, and the offset sensor 104, are each further processed by respective envelope detectors 306 and 308. The envelope detector 306 outputs envelope signal generated from the signal peak of the signal from the target sensor 102. The envelope detector 308 outputs envelope signal generated from the signal peak of the signal from the offset sensor 104. The outputs from these envelope detector 308 provide cleaner signals for comparison than the original signal. In one embodiment, the signal outputs from the envelope detectors 306 and 308 are input to a difference calculator 309 to produce the differential measurement output. In one example embodiment, the difference calculator 309 may comprise a negative weighted multiplier at one of its inputs, to invert the amplitude of the signal from offset sensor 104 and then a signal combiner 310 sums up the two signals to produces an output indicative of the difference between in signal peak intensity at the target and offset frequencies. The functions of the negative weighted multiplier and combiner 310 may be realized by a single device, for example by implementing a differential amplifier. The output from difference calculator 309 is an analog voltage signal, which can be compared to a threshold reference signal in a comparator 312. The threshold reference signal may be set at a voltage level where a greater signal peak intensity would set a positive identification of the target object, and conversely, where a lower signal peak intensity would set a confirmed absence of the target object. The threshold reference signal amplitude can be adjusted to change the sensitivity of the detection system to characteristic peak 204.

Figure 4:
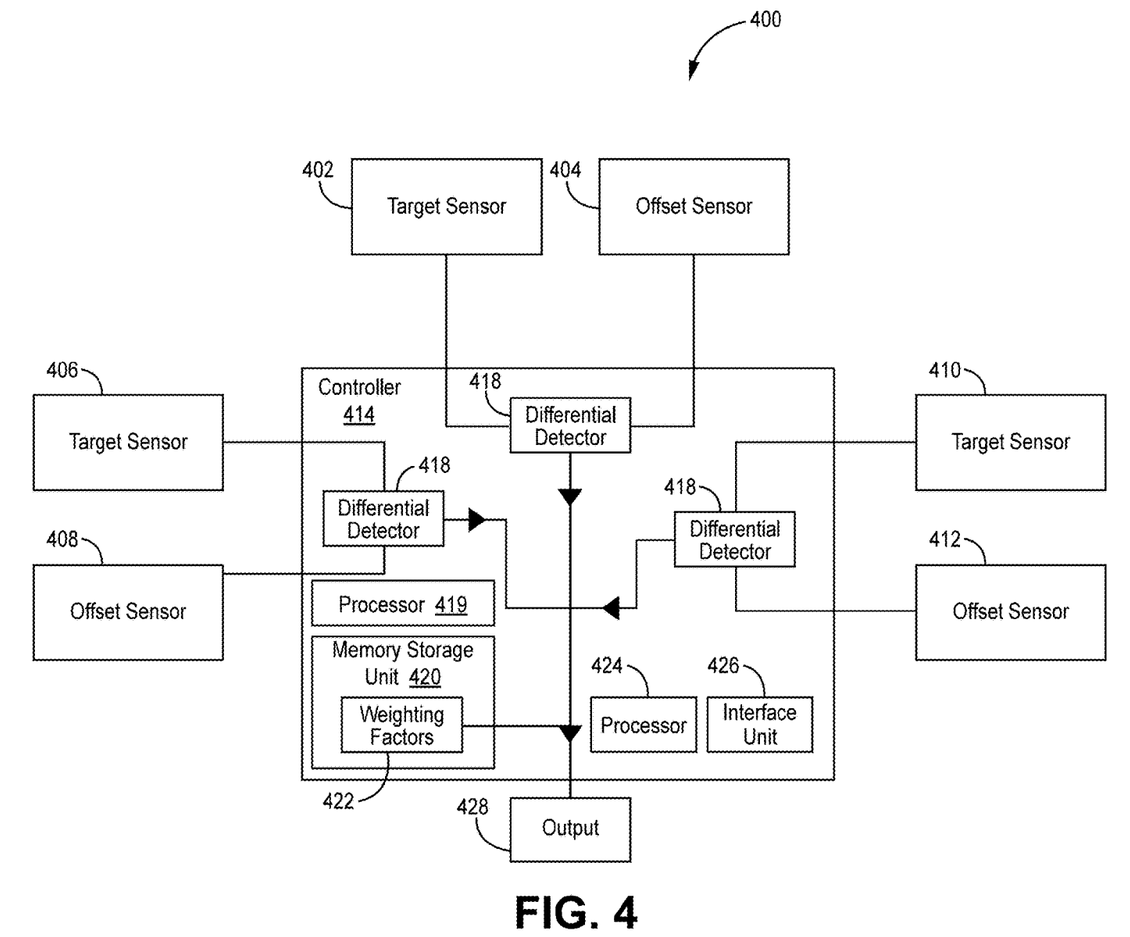
FIG. 4 is a diagram illustrating a multiple target frequencies object detection system as presented in one embodiment of the present disclosure.

In another embodiment, multiple offset sensor pairs, each comprising target sensors and offset sensors such as shown and described in FIGS. 1-3, are used when the acoustical spectrum of the target object from wideband data gathering reveals several target frequencies to be monitored. FIG. 4 describes such an embodiment. To illustrate the use of monitoring several target frequencies, three target sensors 402, 406, and 410 are shown. However, this example is meant to be illustrative only as other implementations of this embodiment may include any number of target and offset sensors. In FIG. 4, each combination of target sensors 402, 406, and 410 and offset sensors 404, 408, and 412 is tuned to a particular target frequency band, based on a set of multiple characteristic signature peaks 204 associated with the objected targeted for detection.

For example, a broadband spectral measurement of a target object can be obtained, and an FFT spectral analysis performed to establish the set of characteristic signature peaks that are associated with that object. For each characteristic signature peaks established by the spectral analysis, there would be an associated offset sensor paid comprising a target sensor tuned to the corresponding target frequency, and an offset sensor, tuned to be offset from that corresponding target frequency. For example, if a FFT spectral analysis of a target object established characteristic signature peaks at 67 Hz, 108 Hz, and 134 Hz, then three groups of target sensors and offset sensors could be used, for example, with target sensor 402 tuned to 67 Hz, target sensor 406 tuned to 108 Hz, and target sensor 410 turned to 134 Hz. Accordingly, offset sensor 404 would be tuned to a frequency offset from 67 Hz, offset sensor 408 would be tuned to a frequency offset from 108 Hz, and offset sensor 412 would be tuned to a frequency offset from 134 Hz. A differential comparison of each target sensor 402, 406, and 410 and offset sensor 404, 408, and 412 combination is performed using a separate differential detector 418 for each offset sensor pair.

As shown in FIG. 4, in some embodiments, the functions of the differential detector 418 may be implemented by a controller 414 comprising a processor 419 coupled to, or otherwise comprising, a memory storage unit 420. The processor may execute code stored in the memory 420 to implement a weighting function 421 that evaluates the outputs of the separate differential detector 418 to make the determination of whether a target object has been detected. That is, a set of weighting factor 422 is stored in the memory 240, and each weighting factor is applied to the output of one of the differential detector 418 and the results processed to determine when a target object has been detected.

Figure 5:
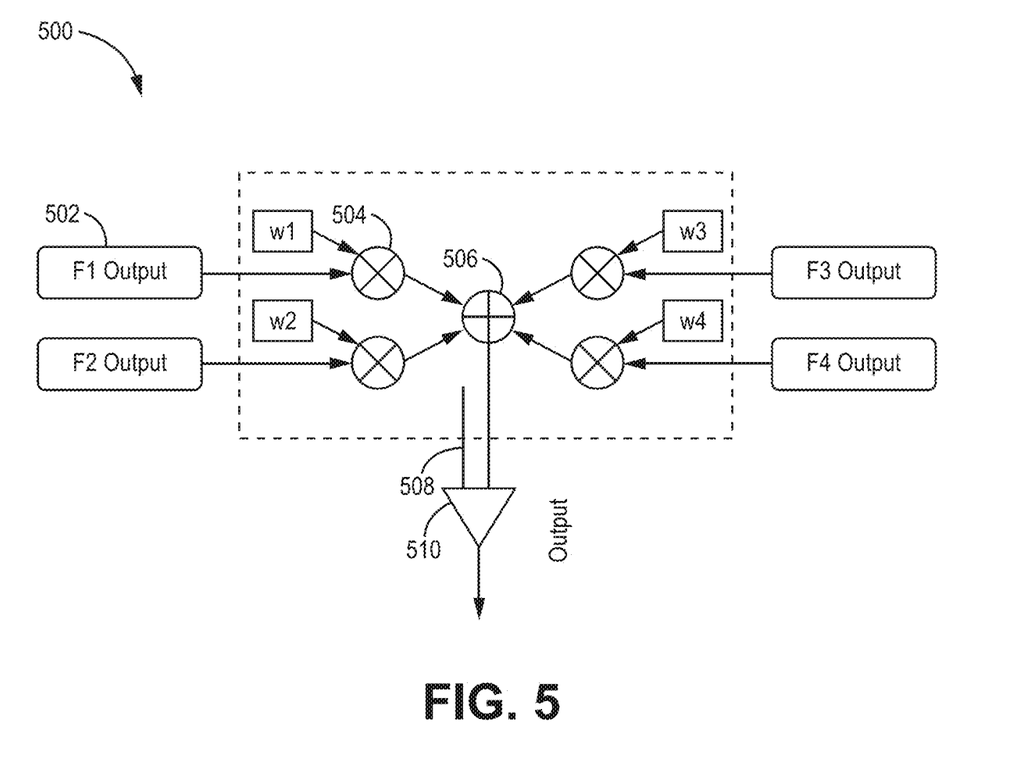
FIG. 5 is a diagram of another multiple target frequencies object detection system as presented in one embodiment of the present disclosure.

FIG. 5 is a block diagram of a differential output weighting function 500 such as the weighting function 421 describe in FIG. 4, where multiple target frequencies, each associated with a characteristic signature peak, are obtained from the acoustical spectrum of the target object. The initial inputs 502 comprise the difference in signal peak intensity from each offset sensor pairs as output from the differential detectors 418. The weighting factor 422 are predetermined values calculated by an algorithm that takes into account various factors, including but not limited to: the number of target frequencies, the magnitude of the differential output signal, and the acoustical characteristics of the target object. Each output from a differential detector 418 is multiplied by one of the weighting factor 422 to obtain a set of weighted differential signals (shown at 504).

The weighted differential signals 504 are combined by the weighting function 500 using a weighted classifier 506. The weighted classifier 506 may combine all weighted frequency signals in a linear fashion, or in other embodiments, may combine them in a non-linear fashion e.g. if a particular target frequency is known to be more probative of identifying the target object than another. The output of the weighted classifier 506 may then be compared to a reference signal 508 to determine if a target object has been detected. The reference signal 508 can be determined based on an algorithm that considers various factors, such as the strength of the background noise and the variance in noise fluctuation. The final output 510 can be converted to a logical or binary output via an analog-to-digital converter as described above.

Figure 6:
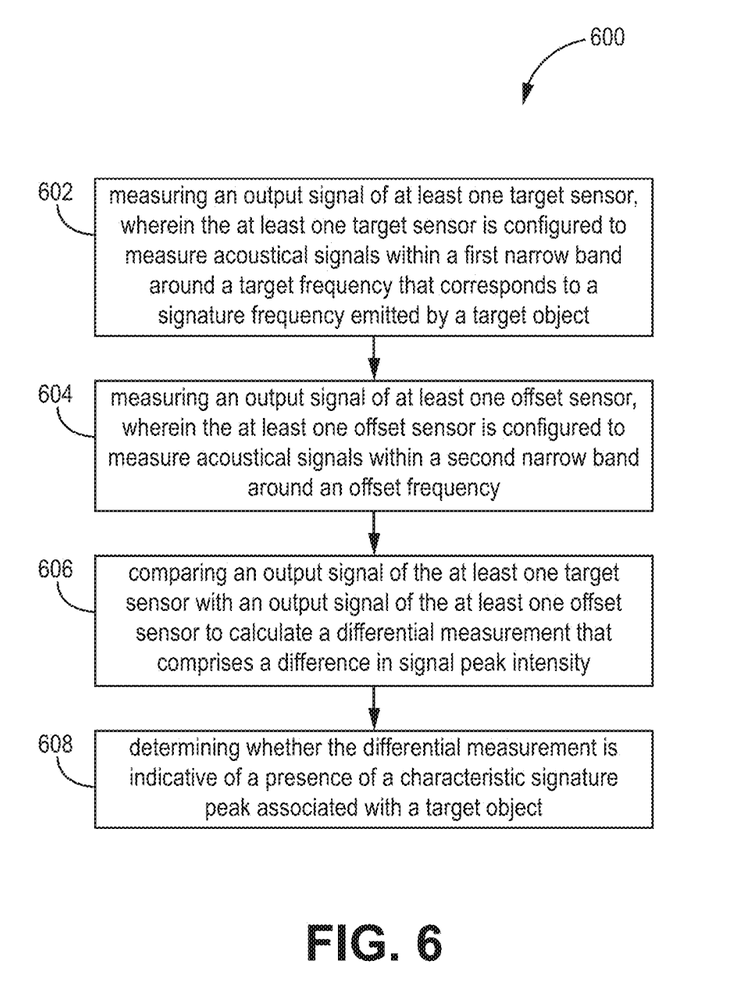
FIG. 6 is flow charts which illustrates a method for one embodiment of the present disclosure.

FIG. 6 is a flow chart depicting a method 600 of identifying an object independent of distance using a differential output measurement of one embodiment of the present disclosure. This method 600 can be implemented, for example, via the single target frequency system 100 described above. The method begins at block 602, where a target sensor tuned to a particular target frequency measures an environmental signal, such as an acoustical signal. Specifically, the target sensor 102 is tuned to detect the magnitude of environmental signals over a narrow range around the target frequency. In some embodiments, the target sensor 102 is calibrated to detect an object genus, rather than a particular species. For example, if the invention is used in the field of vehicle detection, a sensor may be tuned to recognize the characteristic signature peak that is common to a range of vehicles (such as pickup trucks, for example), rather than the more specific vehicle model (such as a Ford F-150, for example). Of course, it is to be understood by one skilled in the art that the size of the class monitored is dependent on the sensitivity of the sensor used. Furthermore, some classes would require analyzing multiple target frequencies, which is discussed in another embodiment below. At block 604, the method proceeds by measuring an output signal of a separate offset sensor 104 tuned to a narrow band around an offset frequency, as described above. That is, the offset sensor 104 may be calibrated to measure environmental signals of a frequency just outside the known target frequency that corresponds to the monitored object. The selection of an appropriate offset frequency band may be based on several factors, including but not limited to, the nature of the object monitored, the magnitude and variation of the background noise signals, and the sensitivity of the sensor. For example, in some embodiments, the center frequency of the offset sensor may be offset from the center frequency of the target sensor on the order of 2-3 Hz.

Proceeding to block 606, the method comprises comparing an output signal of the at least one target sensor with an output signal of the at least one offset sensor to calculate a differential measurement that comprises a difference in signal peak intensity. For example, a difference in signal peak intensity of the environmental signals measured by the target 102 and offset 104 sensors may be determined. In some embodiments, the signals from the target and offset sensors are each input into an envelope detector, which generates the envelope of the combined wavelets.

The method then proceeds to block 608, with determining whether the differential measurement is indicative of a presence of a characteristic signature peak associated with a target object. In some embodiments, this may include comparing the differential measurement to a threshold level. In one embodiment, to trigger a positive result at block 610, an absolute value of the difference in signal peak intensity is greater than the absolute value of the threshold level. Likewise, a negative result may be triggered when the absolute value of the signal peak intensity is less than the reference signal.

Figure 7:
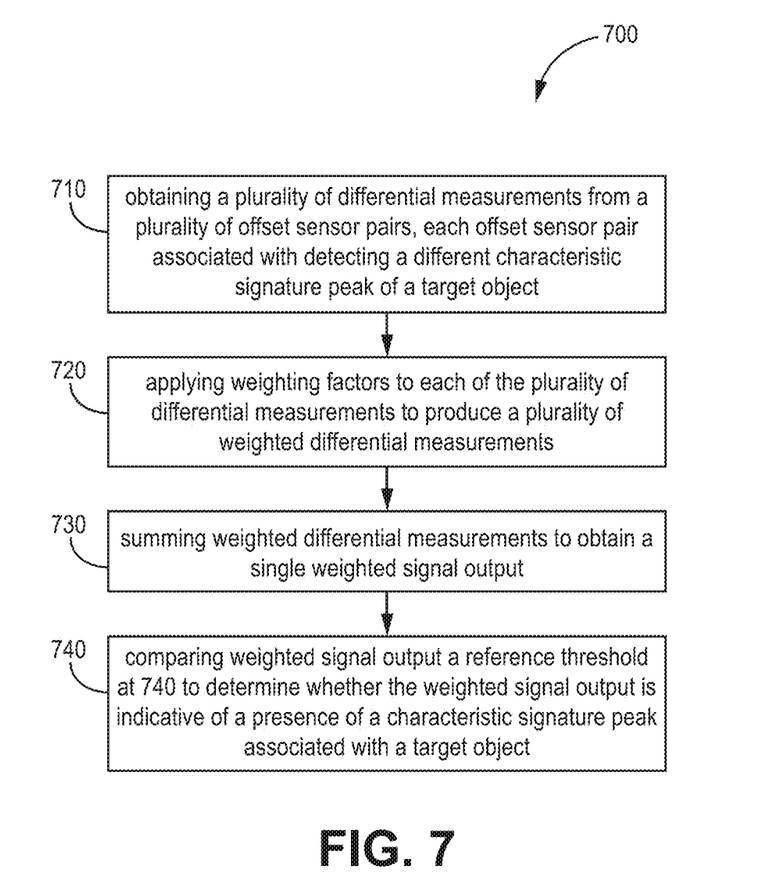
FIG. 7 is a diagram which illustrates a method for one embodiment of the present disclosure.

FIG. 7 is a flow chart depicting a method 700 of identifying an object using a plurality of characteristic signature peak of a target object. Method begins at 710 with obtaining a plurality of differential measurements from a plurality of offset sensor pairs, each offset sensor pair associated with detecting a different characteristic signature peak. In some embodiments, each differential measurement may be obtained in the manner described above with respect to FIG. 6.

The method proceeds to 720 where each plurality of differential measurements are individually weighted using weighting factors to produce a plurality of weighted differential measurements. In some embodiments, the signals can be weighted by multiplying the differential measurement by weighting factor derived from one or more factors, including but not limited to the amount of target frequencies monitored and the signal-to-noise ratio. In some embodiments, each weighted difference is weighted based on a linear classifier. In other embodiments, a non-linear weighing system may be used.

The method proceeds to 730 where the weighted differential measurements are summed to obtain a single weighted signal output, which may comprise one or more statistical techniques that would be known to those skilled in the art. The weighted signal output is then compared to a reference threshold at 740 to determine whether the weighted signal output is indicative of a presence of a characteristic signature peak associated with a target object.

In any of the embodiments described herein, the determination of whether the presence of a target object is detected may be used to trigger transmitting an indication of the presence of the target object, such as to a perimeter monitoring station or for other purposes such as triggering external functions, alarms, or activation of security protocols, for example.

Example Embodiments

Example 1 includes a differential signature detection system comprising: at least one target sensor, wherein the at least one target sensor is configured to measure acoustical signals within a first narrow band around a target frequency; at least one offset sensor, wherein the at least one offset sensor is configured to measure acoustical signals within a second narrow band around an offset frequency; and a controller coupled to the at least one target sensor and the at least one offset sensor, wherein the controller is configured to: compare a signal output of the at least one target sensor with an output of the signal output of the at least one offset sensor to calculate a differential measurement that comprises a difference in signal peak intensity; compare the differential measurement to a reference signal, wherein the reference signal comprises a threshold indicative of a presence of a characteristic signature peak associated with a target object; and produce an output based on the comparison between the differential measurement and the reference signal.

Example 2 includes the system of example 1, wherein the at least one offset sensor is further configured to measure a signal peak of at least one offset frequency by monitoring a narrow band frequency range not including the at least one target frequency.

Example 3 includes the system of any of examples 1-2, wherein the controller is further configured to produce a logic output or a binary output as a function the comparison between the differential measurement and the reference signal.

Example 4 includes the system of any of examples 1-3, wherein the at least one target sensor comprises at least a first and second target sensor, wherein the at least one offset sensor comprises at least a first and second offset sensor.

Example 5 includes the system of example 4, wherein the controller calculates at least a first differential measurement from the first target sensor and the first offset sensor, and a second differential measurement from the second target sensor and the second offset sensor, wherein the first differential measurement and the second differential measurement are individually weighted before compared to the reference signal.

Example 6 includes the system of example 5, wherein the first differential measurement and the second differential measurement are weighted unequally.

Example 7 includes the system of any of examples 1-6, wherein the at least one target frequency corresponds to a characteristic signature peak associated with a vehicle.

Example 8 includes the system of any of examples 1-7, wherein the at least one target sensor and at least one offset sensor is configured to receive a signal input from a piezoelectric sensor.

Example 9 includes the system of any of examples 1-8, wherein the controller further comprises: a target frequency envelope detector coupled to an output of a first target sensor; an offset frequency envelope detector coupled to an output of a first offset sensor; wherein the differential detector determines a difference between an output of the target frequency envelope detector and an output of the offset frequency envelope detector to generate a first differential output.

Example 10 includes the system of any of examples 1-9, wherein the at least one target sensor and at least one offset sensor are tuned to narrow band detection.

Example 11 includes the system of any of examples 1-10, wherein a perimeter monitoring station receives the output from the controller.

Example 12 includes a method for differential signature object identification comprising: measuring an output signal of at least one target sensor, wherein the at least one target sensor is configured to measure acoustical signals within a first narrow band around a target frequency that corresponds to a signature frequency emitted by a target object; measuring an output signal of at least one offset sensor, wherein the at least one offset sensor is configured to measure acoustical signals within a second narrow band around an offset frequency; comparing an output signal of the at least one target sensor with an output signal of the at least one offset sensor to calculate a differential measurement that comprises a difference in signal peak intensity; and determining whether the differential measurement is indicative of a presence of a characteristic signature peak associated with a target object.

Example 13 includes the method of example 12, wherein determining whether the differential measurement is indicative of a presence of a characteristic signature peak associated with a target object comprises: comparing the differential measurement with a reference signal, wherein the reference signal defines a threshold indicative of a presence of a characteristic signature peak associated with a target object, and producing an output based on the comparison between the differential measurement and the reference signal.

Example 14 includes the method of any of examples 12-13, wherein the at least one offset sensor is further configured to measure a signal peak of at least one offset frequency by monitoring a narrow band frequency range not including the at least one target frequency.

Example 15 includes the method of any of examples 12-14, wherein producing an output based on the comparison between the difference in the signal peak intensity and the reference signal further comprises producing a logical or binary signal output.

Example 16 includes the method of any of examples 12-15, wherein the at least one target sensor comprises at least a first and second target sensor, wherein the at least one offset sensor comprises at least a first and second offset sensor, the method further comprising: calculating at least a first differential measurement from the first target sensor and the first offset sensor, and a second differential measurement from the second target sensor and the second offset sensor, wherein the first differential measurement and the second differential measurement are individually weighted before compared to the reference signal.

Example 17 includes the method of example 16, wherein the first differential measurement and the second differential measurement are weighted unequally.

Example 18 includes the method of any of examples 12-17, further comprising: transmitting an indication of a presence of the target object based on determining whether the differential measurement is indicative of a presence of a characteristic signature peak associated with the target object.

Example 19 includes the method of any of examples 12-18, wherein measuring the output signal of the at least one target sensor further comprises measuring the signal peak of an at least one frequency corresponding to a vehicle.

Example 20 includes the method of any of examples 12-19, wherein comparing the output signal of the at least one target sensor with the output signal of the at least one offset sensor further comprises the output signal of the at least one target sensor to be greater than the output signal of the at least one offset sensor.

In various alternative embodiments, system elements, method steps, or examples described throughout this disclosure (such as the controller, differential output weighting function, differential detectors and/or sub-parts thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present disclosure. Therefore, it is manifestly intended that embodiments be limited only by the claims and the equivalents thereof.

What is claimed is:

1. A differential signature detection system, the system comprising:
    at least one target sensor, wherein the at least one target sensor is configured to measure acoustical signals within a first narrow band around a target frequency;
    at least one offset sensor, wherein the at least one offset sensor is configured to measure acoustical signals within a second narrow band around an offset frequency; and
    a controller coupled to the at least one target sensor and the at least one offset sensor, wherein the controller is configured to:
        compare a signal output of the at least one target sensor with an output of the signal output of the at least one offset sensor to calculate a differential measurement that comprises a difference in signal peak intensity;
        compare the differential measurement to a reference signal, wherein the reference signal comprises a threshold indicative of a presence of a characteristic signature peak associated with a target object; and
        produce an output based on the comparison between the differential measurement and the reference signal.

2. The system of claim 1, wherein the at least one offset sensor is further configured to measure a signal peak of at least one offset frequency by monitoring a narrow band frequency range not including the at least one target frequency.

3. The system of claim 1, wherein the controller is further configured to produce a logic output or a binary output as a function the comparison between the differential measurement and the reference signal.

4. The system of claim 1, wherein the at least one target sensor comprises at least a first and second target sensor, wherein the at least one offset sensor comprises at least a first and second offset sensor.

5. The system of claim 4, wherein the controller calculates at least a first differential measurement from the first target sensor and the first offset sensor, and a second differential measurement from the second target sensor and the second offset sensor, wherein the first differential measurement and the second differential measurement are individually weighted before compared to the reference signal.

6. The system of claim 5, wherein the first differential measurement and the second differential measurement are weighted unequally.

7. The system of claim 1, wherein the at least one target frequency corresponds to a characteristic signature peak associated with a vehicle.

8. The system of claim 1, wherein the at least one target sensor and at least one offset sensor is configured to receive a signal input from a piezoelectric sensor.

9. The system of claim 1, wherein the controller further comprises:
   a target frequency envelope detector coupled to an output of a first target sensor;
   an offset frequency envelope detector coupled to an output of a first offset sensor;
   wherein the differential detector determines a difference between an output of the target frequency envelope detector and an output of the offset frequency envelope detector to generate a first differential output.

10. The system of claim 1, wherein the at least one target sensor and at least one offset sensor are tuned to narrow band detection.

11. The system of claim 1, wherein a perimeter monitoring station receives the output from the controller.

12. A method for differential signature object identification, the method comprising:
   measuring an output signal of at least one target sensor, wherein the at least one target sensor is configured to measure acoustical signals within a first narrow band around a target frequency that corresponds to a signature frequency emitted by a target object;
   measuring an output signal of at least one offset sensor, wherein the at least one offset sensor is configured to measure acoustical signals within a second narrow band around an offset frequency;
   comparing an output signal of the at least one target sensor with an output signal of the at least one offset sensor to calculate a differential measurement that comprises a difference in signal peak intensity; and
   determining whether the differential measurement is indicative of a presence of a characteristic signature peak associated with a target object.

13. The method of claim 12, wherein determining whether the differential measurement is indicative of a presence of a characteristic signature peak associated with a target object comprises:
   comparing the differential measurement with a reference signal, wherein the reference signal defines a threshold indicative of a presence of a characteristic signature peak associated with a target object, and
   producing an output based on the comparison between the differential measurement and the reference signal.

14. The method of claim 12, wherein the at least one offset sensor is further configured to measure a signal peak of at least one offset frequency by monitoring a narrow band frequency range not including the at least one target frequency.

15. The method of claim 12, wherein producing an output based on the comparison between the difference in the signal peak intensity and the reference signal further comprises producing a logical or binary signal output.

16. The method of claim 12, wherein the at least one target sensor comprises at least a first and second target sensor, wherein the at least one offset sensor comprises at least a first and second offset sensor, the method further comprising:
   calculating at least a first differential measurement from the first target sensor and the first offset sensor, and a second differential measurement from the second target sensor and the second offset sensor, wherein the first differential measurement and the second differential measurement are individually weighted before compared to the reference signal.

17. The method of claim 16, wherein the first differential measurement and the second differential measurement are weighted unequally.

18. The method of claim 12, further comprising:
   transmitting an indication of a presence of the target object based on determining whether the differential measurement is indicative of a presence of a characteristic signature peak associated with the target object.

19. The method of claim 12, wherein measuring the output signal of the at least one target sensor further comprises measuring the signal peak of an at least one frequency corresponding to a vehicle.

20. The method of claim 12, wherein comparing the output signal of the at least one target sensor with the output signal of the at least one offset sensor further comprises the output signal of the at least one target sensor to be greater than the output signal of the at least one offset sensor.

* * * * *